(12) United States Patent
Baek et al.

(10) Patent No.: US 8,986,875 B2
(45) Date of Patent: Mar. 24, 2015

(54) BATTERY PACK

(75) Inventors: Woon-Seong Baek, Suwon-si (KR);
Sang-Joo Lee, Suwon-si (KR);
Heui-Sang Yoon, Suwon-si (KR);
Jong-Pil Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 513 days.

(21) Appl. No.: 12/881,974

(22) Filed: Sep. 14, 2010

(65) Prior Publication Data

US 2011/0117391 A1 May 19, 2011

(30) Foreign Application Priority Data

Nov. 17, 2009 (KR) .................. 10-2009-0110914

(51) Int. Cl.
*H01M 2/00* (2006.01)
*H01M 2/04* (2006.01)
*H01M 10/42* (2006.01)
*H01M 2/02* (2006.01)

(52) U.S. Cl.
CPC .......... *H01M 2/0426* (2013.01); *H01M 2/0217* (2013.01); *H01M 2/0285* (2013.01); *H01M 2/0404* (2013.01); *H01M 2/0473* (2013.01); *H01M 2/0482* (2013.01); *H01M 2/0486* (2013.01); *H01M 10/425* (2013.01)
USPC .................................................. 429/163

(58) Field of Classification Search
CPC .. H01M 2/105; H01M 2/1022; H01M 2/1061
USPC .......................................... 429/96, 100, 163
See application file for complete search history.

(56) References Cited

U.S. PATENT DOCUMENTS 3,255,658 A * 6/1966 Gargrave ................. 411/337
2011/0064540 A1 * 3/2011 Walther ................... 411/399

FOREIGN PATENT DOCUMENTS

| EP | 2071648 | * | 6/2009 |
| JP | 09-231950 | | 9/1997 |
| KR | 10-2001-0009789 | | 2/2001 |
| KR | 10-2009-033360 | | 4/2009 |
| KR | 10-2009-0051373 A | | 5/2009 |

OTHER PUBLICATIONS

Korean Office action issued on Mar. 25, 2011. Corresponding to Korean Patent Application No. 10-2009-0110914. "Request for Entry of the Accompanying Office Action".

* cited by examiner

*Primary Examiner* — Ula C. Ruddock
*Assistant Examiner* — Thomas H. Parsons
(74) *Attorney, Agent, or Firm* — Robert E. Bushnell, Esq.

(57) ABSTRACT

Provided is a battery pack formed by coupling a cover case and a bare cell. The battery pack includes: a bare cell including a cap plate having a surface in which at least one screw receiving groove is formed; a cover case disposed at a side of the cap plate, and having a surface in which at least one mounting groove is formed and a hole penetrating a center of the mounting groove; and at least one tapping screw including a head part and a body part that are mounted in the mounting groove of the cover case, wherein the body part penetrates the hole and is coupled to the screw receiving groove of the cap plate; wherein the cap plate includes a protruding unit formed in the second surface of the cap plate in correspondence to the screw receiving groove of the cap plate.

13 Claims, 7 Drawing Sheets

BATTERY PACK

RELATED APPLICATIONS

This application claims the benefit of Korean Patent Application No. 10-2009-0110914, filed on. Nov. 17, 2009, in the Korean Intellectual Property Office, the disclosures of which are incorporated herein in their entirety by reference.

BACKGROUND OF THE INVENTION

1. Field of the Invention

One or more embodiments of the present invention relate to a battery pack, and more particularly, to a battery pack formed by coupling a cover case and a bare cell.

2. Description of the Related Art

Recently, portable electric/electronic devices are being made compact and light, for example compact and light cellular phones, notebook computers, camcorders, etc., are being actively developed and produced. Accordingly, portable electric/electronic devices include battery packs so as to be operated even in places where additional power sources are not available. Recently, battery packs have employed economical secondary batteries which are capable of charging and discharging. Representative secondary batteries include a nickel (Ni)-cadmium (Cd) battery, a Ni-MH battery, a lithium (Li) battery, a Li-ion secondary battery, etc. In particular, operation voltage of the lithium ion secondary battery is about three times higher than that of the Ni—Cd battery or the Ni-MH battery, which are usually used as a power source for portable electronic devices. Also, the Li-ion secondary battery is widely used in view of high energy density per unit weight. Secondary batteries generally use lithium-based oxides as positive electrode active materials and carbon-based materials as negative electrode active materials. In general, a secondary battery may be a liquid electrolyte battery or a polymer electrolyte battery according to the type of electrolyte in the secondary battery. In this instance, a Li battery using a liquid electrolyte is referred to as a Li-ion battery, and a Li battery using a polymer electrolyte is referred to as a lithium polymer battery. A secondary battery is formed of a bare cell formed by sealing a can accommodating an electrode assembly and an electrolyte, and a protection circuit substrate electrically connected to the bare cell. The bare cell charges/discharges electricity via a chemical reaction. The protection circuit substrate controls charging/discharging of the bare cell and prevents overcharging/overdischarging of the bare cell to protect the bare cell. When the bare cell and the protection circuit are connected to form the secondary battery, electrical resistance therebetween should be reduced in order to improve charging/discharging efficiency. In more detail, if the electrical resistance between the bare cell and the protection circuit module is high, the charging/discharging efficiency of the bare cell is reduced.

Meanwhile, the secondary battery may be put through a reliability test for determining whether the secondary battery is stable enough to withstand impact caused when mounting the secondary battery in an electronic product, after being formed in a pack by integrally connecting the bare cell and the protection circuit substrate. If there is an external impact, the electrical resistance between the bare cell and the protection circuit substrate could conceivable be increased. The electrical resistance increases as contact resistance increases in a part where the bare cell and the protection circuit substrate are connected.

SUMMARY OF THE INVENTION

One or more embodiments of the present invention include a battery pack formed by coupling a cover case and a bare cell.

Additional aspects will be set forth in part in the description which follows and, in part, will be apparent from the description, or may be learned by practice of the presented embodiments.

According to one or more embodiments of the present invention, the battery pack including: a bare cell including a cap plate having a surface in which at least one screw receiving groove is formed; a cover case disposed at a side of the cap plate, and including a surface in which at least one mounting groove is formed and has a hole penetrating a center of the mounting groove; and at least one tapping screw including a head part and a body part that are mounted in the mounting groove of the cover case, wherein the body part penetrates the hole and is coupled to the screw receiving groove of the cap plate; wherein the cap plate comprises a protruding unit formed in the second surface of the cap plate in correspondence to the screw receiving groove of the cap plate.

The battery pack further may include a protection circuit substrate that is disposed between the cap plate and the cover case and comprises a tap in which a coupling hole is formed in correspondence to the screw receiving groove, wherein the body part of the tapping screw penetrates the coupling hole of the tap, and the tap is electrically connected to the bare cell through the connection between the tapping screw and the screw receiving groove.

The coupling hole of the tap may be formed to be greater than an inside diameter of the body part of the tapping screw and less than an outside diameter of the outside diameter of the body part of the tapping screw.

A connection part between the protruding unit of the cap plate and the second surface of the cap plate may be a curved surface.

A connection part between the protruding unit of the cap plate and the second surface of the cap plate may be an inclined surface.

When the tapping screw fixes the cover case to the cap plate, the screw receiving groove of the cap plate may have such a depth so as to have a space between a lower end surface of the body part of the tapping screw and a bottom surface of the screw receiving groove of the cap plate.

An inner diameter of the screw receiving groove of the cap plate may be greater than an inside diameter of the body part and less than an outside diameter of the body part, thus when the screw receiving groove is coupled to the tapping screw, the shape of an inner circumferential surface of the screw receiving groove is deformed to be tightly adhered to the body part of the first tapping screw, and at least a part of scraps generated due to the shape-change is accommodated in the space.

An inner circumferential surface of the screw receiving groove includes a projection, so that an inscribed circle is greater than the inside diameter of the body part of the tapping screw and is less than the outside diameter of the body part of the tapping screw, when the screw receiving groove is coupled to the tapping screw, the projection of the screw receiving groove is cut and deformed to be tightly adhered to the body part of the tapping screw, and at least a part of the scraps generated due to the shape-change is accommodated in the space.

When the tapping screw fixes the cover case to the cap plate, a length of the body part of the tapping screw and a thickness of the cap plate may each have a predetermined value, so that a lower end surface of the body part reaches or does not reach an upper surface of the cap plate.

The thickness of the cap plate may be in the range of from about 0.8 mm to about 1 mm.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

Figure 1A:
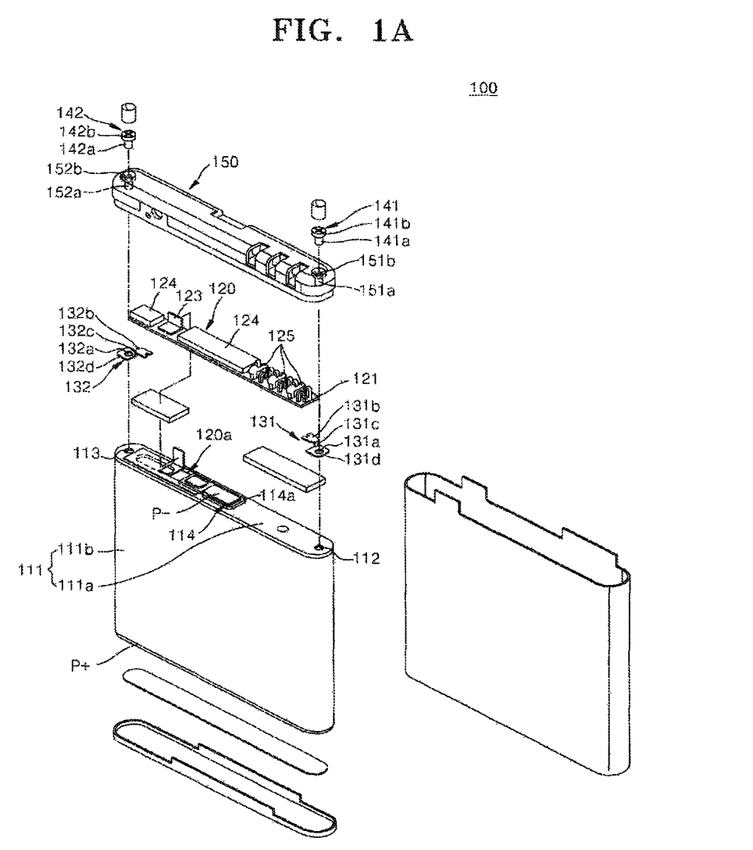
FIG. 1A is an exploded perspective view illustrating a battery pack according to an embodiment of the present invention.
Figure 1B:
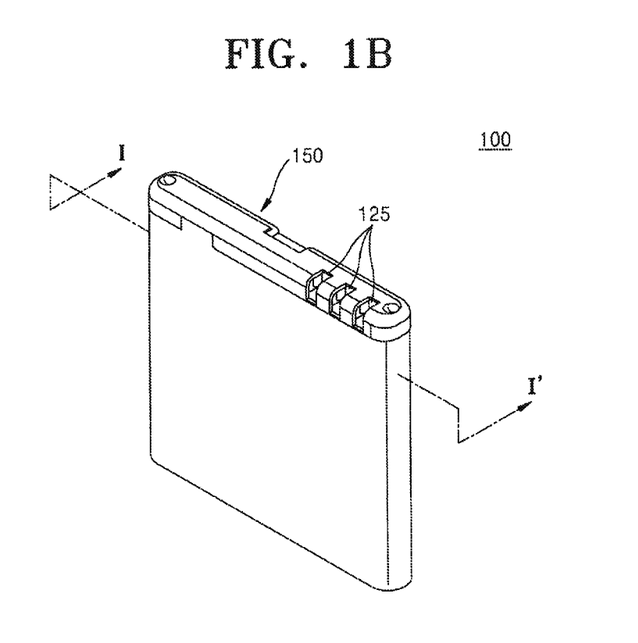
FIG. 1B is a perspective view illustrating an assembled state of the battery pack of FIG. 1A according to an embodiment of the present invention.
Figure 1C:
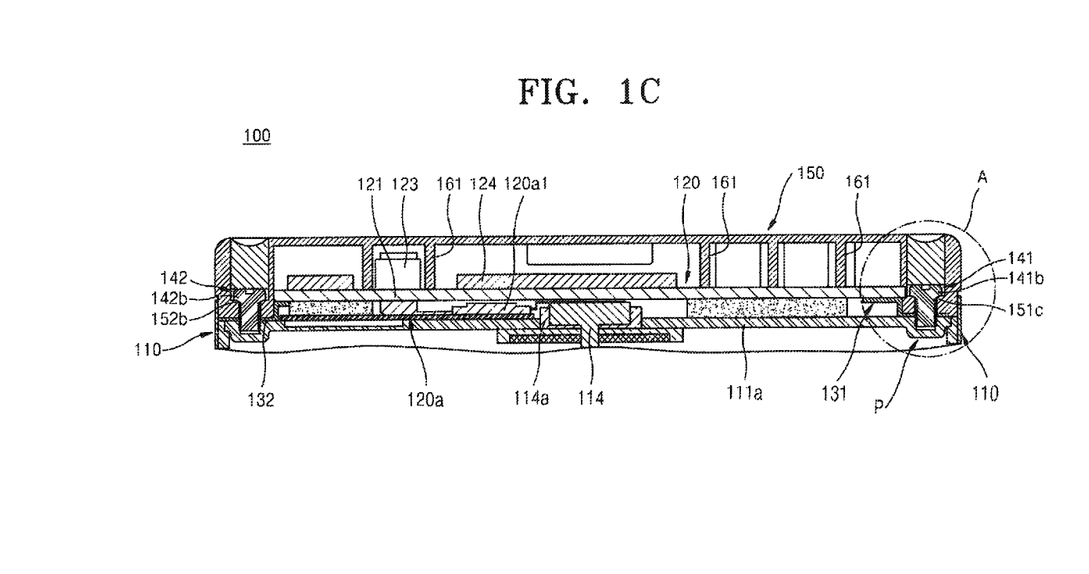
FIG. 1C is a partial cross-sectional view taken along a line I-I of FIG. 1B according to an embodiment of the present invention.
Figure 1D:
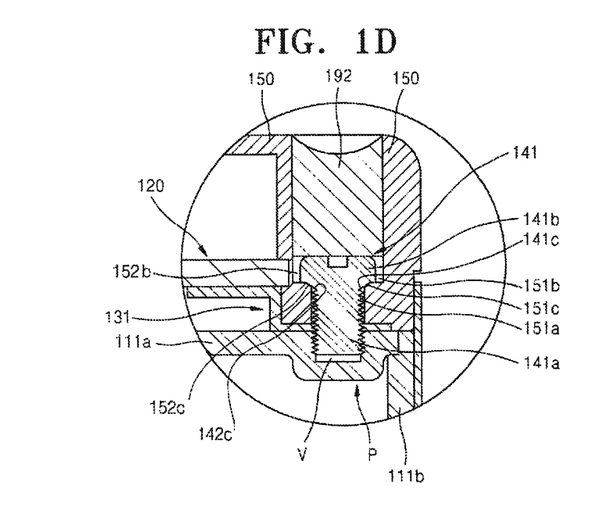
FIG. 1D is an enlarged cross-sectional view illustrating a peripheral portion of a screw bolt of FIG. 1C according to an embodiment of the present invention.

FIG. 1A is an exploded perspective view illustrating a battery pack 100 according to an embodiment of the present invention. FIG. 1B is a perspective view illustrating an assembled state of the battery pack 100 of FIG. 1A according to an embodiment of the present invention. FIG. 1C is a partial cross-sectional view taken along a line I-I of FIG. 1B according to an embodiment of the present invention. FIG. 1D is an enlarged cross-sectional view illustrating a peripheral portion of a screw bolt of FIG. 1C according to an embodiment of the present invention. As illustrated in FIGS. 1A through 1D, the battery pack 100 includes a bare cell 110, a protection circuit substrate 120, a cover case 150, and tapping screws 141 and 142.

The bare cell 110 includes an electrode assembly (not shown) and a sealing assembly 111 accommodating the electrode assembly. The electrode assembly may be formed by winding a positive electrode plate (not shown), a negative electrode plate (not shown), and a separator (not shown). The sealing assembly 111 may include a cap plate 111a and a metal type can 111b and may be formed of a conductive material, for example, aluminum. The metal type can 111b has an open end, and the cap plate 111a covers the open end of the metal type can 111b. An electrode terminal 114 that is insulated by an insulator 114a may be formed in either the metal type can 111b or the cap plate 111a. Referring to FIGS. 1A and 1C, the electrode terminal 114 insulated by the insulator 114a is inserted into the cap plate 111a. The positive electrode plate of the bare cell 110 may be electrically connected to the sealing assembly 111, and the negative electrode plate of the bare cell 110 may be electrically connected to the electrode terminal 114. The electrode terminal 114, which is connected to the negative electrode plate of the bare cell 110, and the sealing assembly 111, which is connected to the positive electrode plate of the bare cell 110, may have different polarities. In the current embodiment, the electrode terminal 114 is electrically connected to the negative electrode plate of the electrode assembly of the bare cell 110 to be a negative electrode P−, and the sealing assembly 111 is electrically connected to the positive electrode plate of the electrode assembly of the bare cell 110 to be a positive electrode P+, but the present invention is not limited thereto. In other words, the bare cell 110 may be a rectangular battery in which the electrode assembly is sealed in the sealing assembly 111 formed of a metal material, in which the positive electrode plate or the negative electrode plate of the electrode assembly is electrically connected to the sealing assembly 111, and the other plate is connected to the electrode terminal 114.

Here, one surface of the cap plate 111a of the bare cell 110 may include at least one selected from the group consisting of screw receiving grooves 112 and 113. Referring to FIG. 1A or 1C, the cap plate 111a includes the first screw receiving groove 112 and the second screw receiving groove 113. The first screw receiving groove 112 may be coupled with the first tapping screw 141, and the second screw receiving groove 113 may be coupled with the second tapping screw 142. Also, a screw thread may be formed in each of inner circumferential surfaces of the first and second screw receiving grooves 112 and 113 in order for the first and second tapping screws 141 and 142 to be coupled therewith. The cap plate 111a may form a protruding part P corresponding to the screw receiving grooves 112 and 113. Various shapes of the protruding part P will be described later with reference to drawings.

The protection circuit substrate 120 may include an insulating substrate 121, a printed circuit pattern (not shown), a conductive pad 123, a protection circuit unit 124, a charging/discharging terminal 125, and first and second taps 131 and 132. The conductive pad 123, the protection circuit unit 124, and the charging/discharging terminal 125 may be soldered to the printed circuit pattern formed on the insulating substrate 121. The protection circuit substrate 120 may be electrically connected to the bare cell 110. That is, a negative electrode of the protection circuit substrate 120 may be electrically connected to the electrode terminal 114, which is the negative electrode P− of the bare cell 110, by a lead tap 120a, and a positive electrode of the protection circuit substrate 120 may be electrically connected to the sealing assembly 110, which is the positive electrode P+ of the bare cell 110, by the first tap 131. A Positive Temperature Coefficient (PTC) device 120a1 is electrically connected between the negative electrode of the protection circuit substrate 120 and the electrode terminal 114 and may block the electrical connection between the negative electrode of the protection circuit substrate 120 and the electrode terminal 114 when the temperature thereof is excessively high or a current excessively flows therethrough. The protection circuit unit 124 may selectively comprise a passive device such as a resistor, a capacitor, or the like, an active device such as a field-effect transistor, a safety device such as the PTC device 120a1, and integrated circuits. The protection circuit unit 124 charges or discharges the bare cell 110 when the bare cell 110 is to be charged/discharged, and blocks a charging/discharging path in the bare cell 110 when the bare cell 110 is overheated or is in an overcurrent state, thereby preventing the bare cell 110 from lifetime degradation, overheating, exploding, and the like.

The first and second taps 131 and 132 are respectively formed on different ends of the protection circuit substrate 120 to electrically connect the protection circuit substrate 120 and the bare cell 110. First and second coupling holes 131a and 132a may be formed in the first and second taps 131 and 132 corresponding to the screw receiving grooves 112 and 113, respectively. Referring to FIG. 1C, the first tap 131 and the second tap 132 are in contact with the cap plate 111a of the bare cell 110. The first and second coupling holes 131a and 132a respectively corresponding to the first and second screw receiving grooves 112 and 113 of the cap plate 111a are formed in the first tap 131 and the second tap 132. The first tap 131 and the second tap 132 support the protection circuit substrate 120 to be disposed on a surface of the bare cell 110, and electrically connect the positive electrode of the protection circuit module 120 and the positive electrode of the bare cell 110. The first tap 131 and the second tap 132 may comprise first sections 131b and 132b, second sections 131c and 132c, and third sections 131d and 132d. Since the first tap 131 and the second tap 132 may be curved in the same manner, descriptions of one tap may be applied to the other tap. For example, the first section 131b of the first tap 131 is soldered to the protection circuit substrate 120. The second section 131c of the first tap 131 is curved in a first direction with respect to the first section 131b. The third section 131d of the first tap 131, in which the first coupling hole 131a is formed, is curved in a second direction with respect to the second section 131c, that is, in an opposite direction to the direction with respect to the first section 131b that the second section 131c is curved. The second and third section 131c and 131d of the first tap 131 are curved so that the protection circuit substrate 120 and a surface of the bare cell 110 may be disposed parallel to each other. The first screw receiving groove 112 formed in the cap plate 111a and the first coupling hole 131a of the first tap 131 are formed corresponding to each other, in such a way that the first tapping screw 141 may be coupled perpendicularly to the bare cell 110. Meanwhile, the second tapping screw 142 passing through the second coupling hole 132a formed in the third section 132d of the second tap 132 may be coupled perpendicularly to the second screw receiving groove 113. The first tap 131 and the second tap 132 are formed of nickel or an alloy including nickel, and thus the coupling and conductivity between the first tap 131 and the second tap 132 and the protection circuit substrate 120 via soldering are enhanced. The first tap 131 and the second tap 132 are disposed to face the protection circuit substrate 120, and thus the conductivity and coupling between the first tap 131 and the second tap 132 and the bare cell 110 are enhanced, thereby reducing contact resistance between the first and second taps 131 and 132 and the bare cell 110.

The cover case 150 includes at least one selected from the group consisting of first and second holes 151a and 152a. Mounting grooves 151b and 152b are formed outside of the first and second holes 151a and 152a. For example, the mounting grooves 151b and 152b are formed to have inner diameters greater than those of the first and second holes 151a and 152a so as to support head parts 141b and 142b of the first and second tapping screws 141 and 142. Hereinafter, the mounting grooves 151b and 152b will be referred to as a first mounting groove 151b and a second mounting groove 152b, respectively. The first tapping screw 141 may be coupled to the first screw receiving groove 112 formed in the bare cell 110 after passing through the first hole 151a formed in the cover case 150 and the first coupling hole 131a formed in the first tap 131. The head part 141b of the first tapping screw 141 may be tightly adhered to the first mounting groove 151b of the cover case 150. The second tapping screw 142 may be coupled in a similar manner. Therefore, the first tapping screw 141 and the second tapping screw 142 couple the cover case 150 to the bare cell 110. The cover case 150 is a plastic case made by molding a resin material such as polycarbonate, and protects the protection circuit substrate 120 from an external impact and prevents a short circuit in the protection circuit substrate 120.

Referring to FIG. 1C, a rib 161 is formed inside the cover case 150, and a rib 161 supports an upper surface of the protection circuit substrate 120 to tightly adhere the protection circuit substrate 120 to the bare cell 110, which prevents the protection circuit substrate 120 from moving, and the contact resistance between the first and second taps 131 and 132 soldered to the protection circuit substrate 120 and the bare cell 110 from increasing. When the cover case 150 is coupled with the first and second tapping screws 141 and 142, the first and second taps 131 and 132 are more tightly adhered to the bare cell 110 to prevent an increase in the contact resistance between the first tap 131 and the bare cell 110.

Referring to FIG. 1D, chamfer parts 151c and 152c are corner parts where the first and second mounting grooves 151b and 152b of the cover case 150 and the first and second holes 151a and 152a of the cover case 150 contact each other. Chamfer parts 141c and 142c of the first and second tapping screws 141 and 142 are slidingly inserted into the chamfer parts 151c and 152c of the cover case 150, such that a center axis of the first and second holes 151a and 152a of the cover case 150 and a center axis of the first and second tapping screws 141 and 142 are aligned, thereby reducing assembly error between the cover case 150 and the first and second tapping screws 141 and 142. The cover case 150 is tightened onto the bare cell 110 via the first and second tapping screws 141 and 142 and is integrally formed with the bare cell 110. The cover case 150 tightly adheres the protection circuit substrate 120 to the cap plate 111a so as to prevent the protection circuit substrate 120 from moving. In addition, the first tap 131 is soldered to the protection circuit substrate 120 and is thus electrically connected to the bare cell 110. Since the first tap 131 is tightly adhered to the cap plate 111a by the pressure of the cover case 150, it prevents an increase in the contact resistance between the first tap 131 and the cap plate 111a. Meanwhile, when the first tapping screw 141 is coupled to the first screw receiving groove 112 of the bare cell 110, a space G (FIG. 2) having a greater diameter than that of the first screw receiving groove 112 is formed in an upper end part of the first screw receiving groove 112 to prevent a burr from being generated, thereby preventing an increase in the contact resistance due to external impact.

The first and second tapping screws 141 and 142 include body parts 141a and 142a and head parts 141b and 142b. The body parts 141a and 142a of the first and second tapping screws 141 and 142 include a screw thread that is screw-coupled to the screw receiving groove 112 and 113 of the bare cell 110. The head parts 141b and 142b of the first and second tapping screws 141 and 142 are formed in an upper part of the body parts 141a and 142a, and have a diameter greater than that of the body parts 141a and 142a. In FIG. 1A, grooves marked with + are formed in the head parts 141b and 142b of the first and second tapping screws 141 and 142 to facilitate rotation. The shape of the grooves is not limited thereto. In the present invention, one of ordinary skill in the art may envision the groove having various shapes. In addition to the + mark, the grooves may be marked with '– or *. A screw driver is inserted into the grooves so that the first and second tapping screws 141 and 142 may be screw-coupled to the bare cell 110. The first and second tapping screws 141 and 142 are coupled to the first and second screw receiving grooves 112 and 113b formed on different sides of the bare cell 110, so that the protection circuit substrate 120 may not be twisted and so that the coupling between the first and second taps 131 and 132 and the protection circuit substrate 120 by soldering is enhanced, thereby preventing an increase in contact resistance.

A method of coupling the protection circuit substrate 120 and the cover case 150 with the cap plate 111a of the bare cell 110 using the first and second tapping screws 141 and 142 will now be described with reference to FIG. 1D. Since operation of the first tapping screw 141 is similar to that of the second tapping screw 142, only the first tapping screw 141 will be described below. The first tapping screw 141 may be coupled to the first screw receiving groove 112 formed in the cap plate 111a of the bare cell 110 after passing through the first hole 151a formed in a center of the cover case 150 and the first coupling hole 131a formed in the first tap 131. The cap plate 111a includes the protruding part P so as to be coupled with the first tapping screw 141. If the cap plate 111a is formed as a straight flat plate not including the protruding part P, the first and second tapping screws 141 and 142 may be coupled to the cap plate 111a by an amount corresponding to a thickness of the cap plate 111a. Therefore, when the coupling between the first and second tapping screws 141 and 142 and the cap plate 111a is low, and thus if the first and second tapping screws 141 and 142 is penetrated, electrolyte may leak. However, referring to FIG. 1D, a part of the cap plate 111a corresponding to where the first tapping screw 141 and the cap plate 111a are coupled to each other is formed to be thick, that is, the protruding part P is formed in the thick part, thereby increasing stability. Also, when the first tapping screw 141 fixes the cover case 150 and the protection circuit substrate 120 to the cap plate 111a, the screw receiving groove 112 of the cap plate 111a may have a sufficient depth so as to form a space V between a lower end surface of the body part 141a of the first tapping screw 141 and a bottom surface of the screw receiving groove 112 of the cap plate 111a. In this instance, when the first tapping screw 141 fixes the cover case 150 and the protection circuit substrate 120 to the cap plate 111a, a length of the body part 141a of the first tapping screw 141 and a thickness of the cap plate 111a may each be a predetermined value, so that the lower end surface of the body part 141a reaches or does not reach an upper surface of the cap plate 111a. That is, referring to FIG. 1D, the lower end surface of the first tapping screw 141 is coupled not to exceed the thickness of the cap plate 111a, thereby forming the space V in the lower end part of the body part 141a of the first tapping screw 141. In order to form this structure, the thickness of the cap plate 111a, the length of the body part 141a of the first tapping screw 141, or step heights of the first and second holes 151a and 152a of the first and second mounting grooves 151b and 152b of the cover case 150 may be controlled. For example, the thickness of the cap plate 111a may be in a range of from about 0.8 mm to about 1 mm.

A screw groove may be formed in an inner circumferential surface of the screw receiving groove 112 to be coupled with the first tapping screw 141. Alternatively, the screw groove is not formed, and the inner circumferential surface is formed to be smaller than an outside diameter of the first tapping screw 141, so that the screw thread of the first tapping screw 141 is coupled to the inner circumferential surface of the screw receiving groove 112 by cutting an outer surface of the screw groove. For example, the inner diameter of the screw receiving groove 112 of the cap plate 111a is greater than an inner diameter of the body part 141a and less than an outside diameter of the body part 141a. Therefore, when the screw receiving groove 112 is coupled to the first tapping screw 141, the inner circumferential surface of the screw receiving groove 112 is deformed to be tightly adhered to the body part 141a of the first tapping screw 141. At this time, if the inner circumferential surface of the screw receiving groove 112 is cut and deformed by the screw thread of the body part 141a of the first tapping screw 141, scraps are generated. These scraps may be accommodated in the space V, formed between the screw 141 and the protruding part P of the cap plate 111a. The cap plate 111a may include a light alloy, such as aluminum, so as to be easily deformed by the screw thread of the first tapping screw 141.

Figure 2:
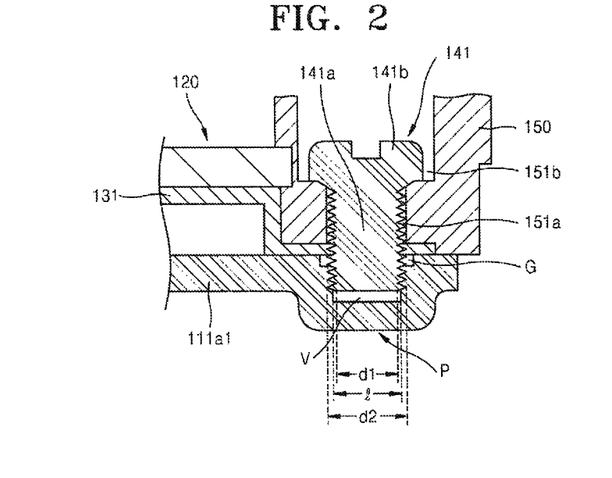
FIG. 2 is a cross-sectional view illustrating the peripheral portion of a screw bolt of FIG. 1D, according to another embodiment of the present invention.

Also, the cap plate 111a may include not only the space V but also the groove G in the upper part of the screw receiving groove 112 in order to accommodate the scraps. Referring to FIG. 2, an inner diameter 1 of the screw receiving groove 112 of a cap plate 111a1 is greater than a inside diameter $d_1$ of the body part 141a and less than an outside diameter $d_2$ of the body part 141a of the first tapping screw 141. Thus, when the screw receiving groove 112 is coupled to the first tapping screw 141, the inner circumferential surface of the screw receiving groove 112 is deformed, thereby generating scraps. The groove G has an inner diameter greater than the inner circumferential surface of the screw receiving groove 112 and is formed in the upper part of the screw receiving groove 112 of the cap plate 111a1, and thus may accommodate scraps generated when the first tapping screw 141 is coupled with the cap plate 111a1.

Figure 3A:
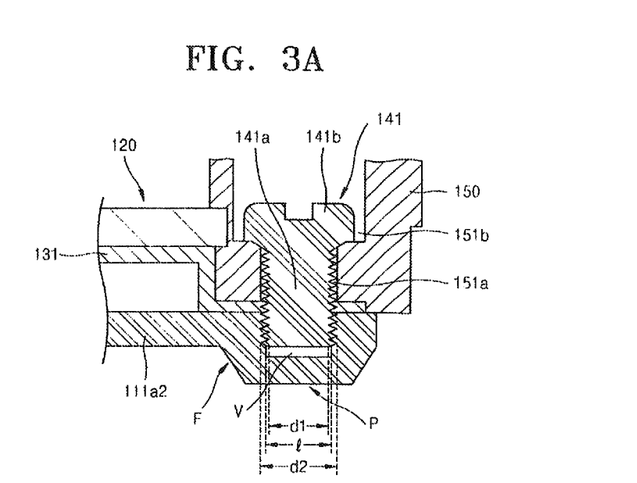
FIG. 3A is a cross-sectional view illustrating the peripheral portion of a screw bolt of FIG. 1D, according to another embodiment of the present invention.
Figure 3B:
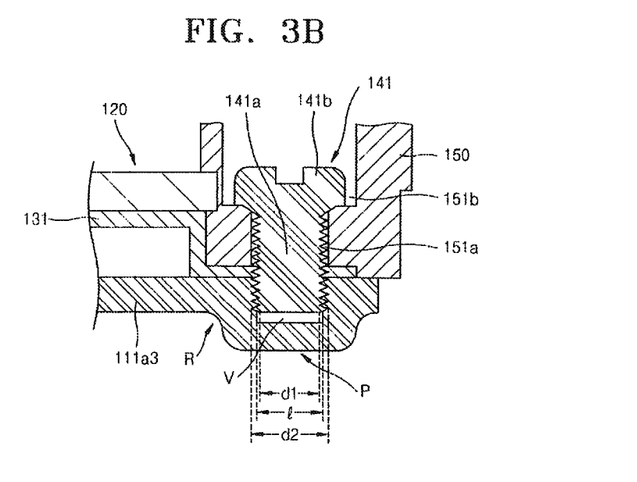
FIG. 3B is a cross-sectional view illustrating the peripheral portion of a screw bolt of FIG. 1D, according to another embodiment of the present invention.

Referring to FIG. 3A, a connection part between the protruding part P of the cap plate 111a2 and a lower plane of a cap plate 111a2 may be an inclined surface F. However, the shape of the connection part is not limited thereto, and the connection part may be a curved surface R as illustrated in a cap plate 111a3 of FIG. 3B. As such, the connection part between the protruding part P and the cap plate 111a2 or 111a3 may be the inclined surface F or the curved surface R, so that stress is not concentrated in the connection part therebetween, thereby increasing stability. For example, the flat inclined surface F and the curved surface R effectively withstands pressure due to an electrolyte included inside the sealing assembly 110, thereby preventing the electrolyte from leaking. Also, even when the first tapping screw 141 is coupled in a wrong direction, the first tapping screw 141 does not penetrate the cap plates 111a2 and 111a3, thereby preventing the electrolyte from leaking.

Figure 4:
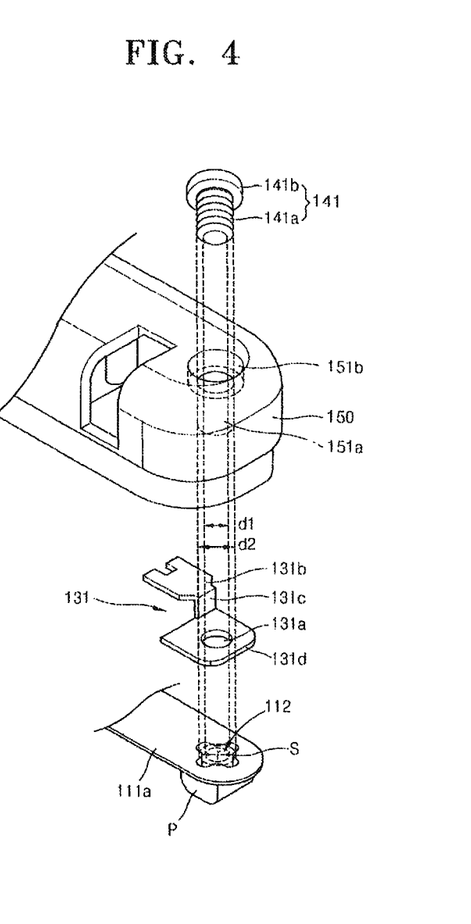
FIG. 4 is a perspective view of the peripheral portion of a screw bolt of FIG. 1D including a projection, according to another embodiment of the present invention.
Figure 5A:
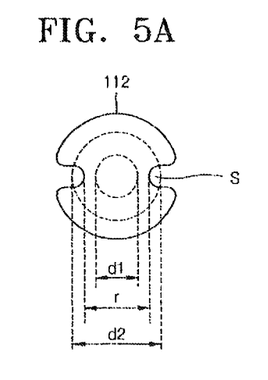
FIGS. 5A and 5B are plane views of a screw receiving groove according to an embodiment of the present invention.
Figure 5B:
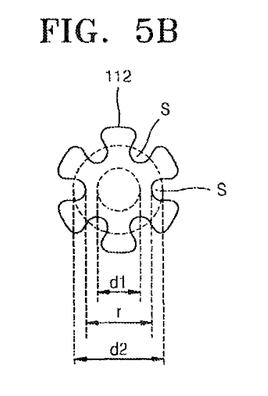

Referring to FIG. 4, the first tapping screw 141 passes through the first coupling hole 131a of the first tap 131 and is coupled to the screw receiving groove 112 of the cap plate 111a. In this instance, an inner diameter of the first coupling hole 131a may be greater than the is inside diameter $d_1$ of the body part 141a of the first tapping screw 141 and less than the outside diameter $d_2$. When the screw receiving groove 112 is coupled with the first tapping screw 141, the inner diameter of the coupling hole 131a is deformed, for example, enlarged. Thus, the coupling hole 131a is tightly adhered to the first tapping screw 141, thereby reducing electrical resistance (therebetween). The screw receiving groove 112 of the cap plate 111a may include a projection S. The projection S may be formed to have an inscribed circle r that is greater than the inside diameter $d_1$ of the body part 141a of the first tapping screw 141 and less than the outside diameter $d_2$ of the body part 141a of the first tapping screw 141. When the screw receiving groove 112 is coupled to the first tapping screw 141, the projection S of the screw receiving groove 112 is cut and deformed by the screw thread of the first tapping screw 141 to be tightly adhered to the body part 141a of the first tapping screw 141. Scraps generated by the deformation of the projection S may be moved to the space V through a gap between the projections S and accommodated in the space V. The arrangement and the shape of the projection S are not limited thereto, and one of ordinary skill in the art would understand that various other configurations are possible. FIGS. 5A and 5B are plane views of the screw receiving groove 112 according to an embodiment of the present invention. Two projections S may be formed as illustrated in FIG. 5A, or a plurality of projections S may be formed as illustrated in FIG. 5B. In this instance, a distance r of ends of the projection S may be formed to be greater than the inside diameter $d_1$ of the body part 141a of the first tapping screw 141 and to be less than the outside diameter $d_2$ of the body part 141a of the first tapping screw 141 to deform the projection S when the first tapping screw 141 is coupled to the screw receiving groove 112, thus the first tapping screw 141 is coupled to the screw receiving groove 112 and they may be further tightly adhered to each other.

It should be understood that the exemplary embodiments described therein should be considered in a descriptive sense only and not for purposes of limitation. Descriptions of features or aspects within each embodiment should typically be considered as available for other to similar features or aspects in other embodiments.

What is claimed is:

1. A battery pack, comprising:
   a bare cell comprising a cap plate having a first surface having at least one screw receiving groove, the cap plate comprising a protruding unit formed on a second surface of the cap plate in correspondence to the position of the screw receiving groove of the cap plate;
   a cover case disposed at a side of the cap plate and comprising a surface with at least one mounting groove and a hole at approximately the center of the mounting groove; and
   at least one tapping screw comprising a head part and a body part, the head part is mounted in the mounting groove of the cover case and the body part penetrates the hole and is coupled to the screw receiving groove of the cap plate, when the tapping screw fixes the cover case to the cap plate, and the screw receiving groove of the cap plate has a depth so as to have a space between a lower end surface of the body part of the tapping screw and a bottom surface of the screw receiving groove of the cap plate and the lower end surface of the first tapping screw is coupled not to exceed the thickness of the cap plate, and
   an inner circumferential surface of the screw receiving groove comprising a projection such that an inscribed circle that is tangent to both of the inner circumferential surface and the projection being greater than the inside diameter of the body part of the tapping screw and being less than the outside diameter of the body part of the tapping screw.

2. The battery pack of claim 1, further comprising a tap disposed between the cap plate and the cover case and having a coupling hole in correspondence to the screw receiving groove, the body part of the tapping screw penetrating the coupling hole of the tap, and a protection circuit substrate being electrically connected to the bare cell through the connection between the tapping screw and the screw receiving groove.

3. The battery pack of claim 2, a cross-sectional dimension of the coupling hole of the tap being greater than an inside diameter of the body part of the tapping screw and less than an outside diameter of the body part of the tapping screw.

4. The battery pack of claim 1, a connection part between the protruding unit of the cap plate and the second surface of the cap plate being a curved surface.

5. The battery pack of claim 1, a connection part between the protruding unit of the cap plate and the second surface of the cap plate being an inclined surface.

6. The battery pack of claim 1, an inner diameter of the screw receiving groove of the cap plate being greater than an inside diameter of the body part and less than an outside diameter of the body part.

7. The battery pack of claim 1, the inner circumferential surface of the screw receiving groove being deformable.

8. The battery pack of claim 1, at least a part of scraps of the screw receiving groove being accommodated in the space.

9. The battery pack of claim 1, the projection being deformable.

10. The battery pack of claim 1, at least a part of scraps of the projection being accommodated in the space.

11. The battery pack of claim 1, when the tapping screw fixes the cover case to the cap plate, a length of the body part of the tapping screw and a thickness of the cap plate may each have a predetermined value such that a lower end surface of the body part reaches or does not reach a horizontal plane of the second surface of the cap plate.

12. The battery pack of claim 1, the thickness of the cap plate being in a range from about 0.8 mm to about 1 mm.

13. The battery pack of claim 11, the thickness of the cap plate being in a range from about 0.8 mm to about 1 mm.

* * * * *